(12) United States Patent
Harb et al.

(10) Patent No.: US 12,342,045 B2
(45) Date of Patent: Jun. 24, 2025

(54) METHODS AND SYSTEMS FOR DISPLAYING CONTENT DURING A LOADING EVENT

(71) Applicant: Adeia Guides Inc., San Jose, CA (US)

(72) Inventors: Reda Harb, Issaquah, WA (US);
Srikanth Channapragada, Karnataka (IN); Vishwas Sharadanagar Panchaksharaiah, Karnataka (IN); Pooja Srivastava, Bengaluru (IN); Harsha Neerakani, Karnataka (IN)

(73) Assignee: Adeia Guides Inc., San Jose, CA (US)

( * ) Notice: Subject to any disclaimer, the term of this patent is extended or adjusted under 35 U.S.C. 154(b) by 0 days.

(21) Appl. No.: 17/902,364

(22) Filed: Sep. 2, 2022

(65) Prior Publication Data
US 2024/0080527 A1    Mar. 7, 2024

(51) Int. Cl.
*H04N 21/466* (2011.01)
*H04N 21/431* (2011.01)

(52) U.S. Cl.
CPC ..... *H04N 21/4668* (2013.01); *H04N 21/4316* (2013.01)

(58) Field of Classification Search
CPC ........... H04N 21/4668; H04N 21/4316; H04N 21/8126; H04N 21/4524; H04N 21/4331
See application file for complete search history.

(56) References Cited

U.S. PATENT DOCUMENTS

| | | | |
|---|---|---|---|
| 10,063,939 B1 * | 8/2018 | Hegde | H04N 21/4331 |
| 10,848,815 B2 * | 11/2020 | Yao | H04N 21/433 |
| 11,010,946 B2 | 5/2021 | Sen et al. | |
| 2005/0144637 A1 * | 6/2005 | Shikata | H04N 21/482 725/35 |
| 2006/0248570 A1 * | 11/2006 | Witwer | H04N 21/4312 348/E7.071 |
| 2006/0294538 A1 | 12/2006 | Li et al. | |
| 2008/0046924 A1 | 2/2008 | Hood | |
| 2008/0168497 A1 | 7/2008 | Mitchem | |
| 2009/0055268 A1 | 2/2009 | Knoller et al. | |
| 2009/0193134 A1 | 7/2009 | Lau et al. | |
| 2010/0198943 A1 * | 8/2010 | Harrang | H04L 65/80 709/224 |
| 2012/0054043 A1 | 3/2012 | Agarwal et al. | |
| 2012/0307152 A1 | 12/2012 | Zaslavsky et al. | |
| 2017/0006343 A1 * | 1/2017 | Miller | H04N 21/4524 |
| 2017/0070789 A1 | 3/2017 | Liassides et al. | |
| 2017/0098252 A1 | 4/2017 | Box et al. | |
| 2021/0289261 A1 * | 9/2021 | Sharma | H04N 21/8126 |
| 2022/0191586 A1 * | 6/2022 | Toullec | H04N 21/4331 |
| 2024/0080515 A1 | 3/2024 | Harb et al. | |

OTHER PUBLICATIONS

U.S. Appl. No. 17/902,369, filed Sep. 2, 2022, Reda Harb.

* cited by examiner

*Primary Examiner* — Yassin Alata

(74) *Attorney, Agent, or Firm* — Haley Guiliano LLP

(57) ABSTRACT

There is provided systems and methods for displaying content to a user during a loading event. The systems and methods comprise receiving recommendation data from a recommendation engine, downloading a first media content item based on the recommendation data, detecting a loading event, such as buffering, and in response to the loading event, displaying the first media content item.

16 Claims, 12 Drawing Sheets

```
0   <?xml version="1.0" encoding="UTF-8"?>
1   <MPD xmlns:xsi="http://www.w3.org/2001/XMLSchema-instance" xmlns="urn:mpeg:dash:schema:mpd:2011 DASH-MPD.xsd
2   <BaseURL>https://video.platform.com/v1</BaseURL>
3   <Period>
4   <!-- English Audio --> <BIDTAG="0" Priority="Low">
5   <AdaptationSet mimeType="audio/mp4" codecs="mp4a.40.5" lang="en" subsegmentAlignment="true" subsegmentStartsWithSAP="1">
6     <Representation id="0" bandwidth="64000">
7       <URL>JoelsLatestAlbum_AAC48K_064.mp4.dash</BaseURL>
8     </Representation>
9   </AdaptationSet>
10  <!-- Video -->
11  <AdaptationSet mimeType="video/mp4" codecs="avc1.42401E" subsegmentAlignment="true" subsegmentStartsWithSAP="1">
12    <Representation id="1" bandwidth="1000000" width="2160" height="1440"><BIDTAG="1" Priority="High">
13      <URL>BigNewMovie_H264BPL30_0100.264.dash</BaseURL>
14    </Representation>
15    <Representation id="2" bandwidth="2000000" width="3840" height="2160"><BIDTAG="0" Priority="Low">
16      <URL>LatestEpisodeRelease_H264BPL30_0200.264.dash</BaseURL>
17    </Representation>
18  </AdaptationSet>
19  </Period>
20  </MPD>
```

FIG. 8

```
 1  <Representation id="1" codecs="avc1" mimeType="video/mp4" width="2160" height="1440" startWithSAP="1">
 2    <SegmentList duration="3">
 3      <SegmentURL media="main/NewShow1/2.m4s" mediaRange="863-7113" BIDTAG="L"/>
 4      <SegmentURL media="main/MostPopularShow/3.m4s" mediaRange="7114-14104" BIDTAG="M"/>
 5      <SegmentURL media="main/NewShow1poster.m4s" mediaRange="0-1" BIDTAG="H"/>
 6    </SegmentList>
 7  </Representation>
 8  <Representation id="2" codecs="avc1" mimeType="video/mp4" width="3840" height="2160" startWithSAP="1">
 9    <SegmentList duration="3">
10      <SegmentURL media=" main/TeaserTrailer1/2.m4s " mediaRange="865-11523" BIDTAG="L"/>
11      <SegmentURL media="main/TeaserTrailer2/3.m4s" mediaRange="11524-25621" BIDTAG="M"/>
12      <SegmentURL media="main/CinematicTrailer1/4.m4s" mediaRange="25622-33693" BIDTAG="H"/>
13    </SegmentList>
14  </Representation>
```

FIG. 9

METHODS AND SYSTEMS FOR DISPLAYING CONTENT DURING A LOADING EVENT

BACKGROUND

The present disclosure relates to methods and systems for displaying content and, more particularly, to systems and related processes for displaying content to a user during a loading event when accessing an over-the-top, OTT, service.

SUMMARY

In the past few years, the number of people turning to the internet for news, entertainment, education, and more has increased exponentially. Over-the-top (OTT) video consumption is consistently rising, with predictions that the online streaming market will be worth $1039 billion by the year 2027. There is heavy competition between OTT service providers, such as Netflix, Disney+, Crunchy Roll, and the like, to promote their content to users and increase subscriber count, especially as new service providers enter the market. Accordingly, with such a diverse range of offerings, and users/households typically having access to more than one provider, users watch content across a plurality of different OTT providers. Often, users have access to a content aggregator, such as Google TV, Apple TV, or a smart TV with such an offering, such as those offered by Samsung and the like.

When content aggregators, or OTT services providers in general, are launched (e.g., the user selects an application), users want access to their content as soon as possible, ideally immediately. "Loading spinners," an icon shown to the user that typically rotates or spins on-screen, are visually unattractive and frustrate users, similarly, static images are not entertaining nor stimulating to a user—and sometimes lead to confusion on whether the application has frozen or become unresponsive. High loading times are often because when the user selects the application, it attempts to authenticate the domain token and, if it has expired, must go through reauthentication and fetch a new domain token. This is exaggerated for content aggregators because they typically require multiple application programming interfaces (APIs) to load content. The issue is also exaggerated for users with low bandwidth.

In addition, users are often presented with advertisements across a variety of websites and platforms. In one approach, advertisements are targeted to particular users based on demographics, location, behavior (e.g., browsing behavior, device usage, etc.), user interests, etc. (e.g., targeted advertising). For example, in one approach, to target particular users with relevant advertisements, advertisers may access or maintain user profiles associated with particular users and select personalized advertisements based on the profiles. Additionally, in some approaches, advertisements may be targeted based on the content of a website or media asset a user is currently consuming.

Therefore, a system that is able to determine that the user is about to enter a streaming application, root menu, turn on a content aggregator, or other landing page and display media content (e.g., artwork, clips of content, trailers) relevant to the user from their OTT providers would be desirable. The media content displayed would be stored locally (e.g., cached) and therefore is not dependent on bandwidth or authentication requests and can be retrieved immediately. For example, the next time a user launches an OTT app, instead of displaying a loading indicator or static images, previously stored media content can be retrieved from the cache and displayed.

Current advertising retargeting techniques rely on showing users relevant advertisements on another site that they visit (e.g., a user might have started buying an item such as a jacket on website A, but didn't complete the sale). Retargeting allows website A to present (via an advertisement distribution network) a relevant visual advertisement about the item, on a different site that the user visits (given that the website is enabled to do so). Therefore, a system that enables an OTT service provider, for example, service A, to promote its exclusive content to a user that is launching an application associated with another service, for example, service B, would be desirable. In particular, a service that is able to communicate to various applications and platforms that an advertisement slot is available and, in some examples, provides a dynamic bid process for the slot.

Accordingly, in a first aspect of the invention, there is provided a method for displaying content to a user during a loading event. The method comprises receiving recommendation data from a recommendation engine; downloading first media content item based on the recommendation data; detecting a loading event; and in response to the loading event, displaying the first media content item.

In some examples, the downloading of the first media content item is during a first viewing session, and the detection of the loading event is during a second viewing session.

In some examples, the recommendation data comprises a list of media content items and an indication of priority of the media content items to be recommended to the user, and the first media content item is the highest priority media content to be recommended to the user.

In some examples, the method further comprises downloading a second media content item during the first viewing session, wherein the second media content item is the second highest priority media content to be recommended to the user.

In some examples, the method further comprises determining that the first media content item has finished being displayed during the loading event, and displaying the second media content item after the first media content item.

In some examples, the list of media content items comprises media content that is not available for viewing at the first viewing sessions and further comprises downloading a third media content item, that is not available for viewing at the first viewing session. In some examples, the method further comprises determining that the third media content item is available for viewing during the second viewing session; determining that the third media content item has the highest priority out of the downloaded media content items, and displaying the third media content item during the second viewing session.

In some examples, the method further comprises determining whether the user is about to finish the first viewing session. In response to determining the user is about to finish the first viewing session, the method further comprises updating the recommendation data and downloading media content items to be displayed at the second viewing session. In some examples, determining the user is about to finish the first viewing session is based on at least one of detecting a media content item is about to finish; user watching pattern (e.g., users only ever watch one episode or movie at a time); user watch history; and determining a current time is near the user's bedtime (e.g., based on phone sleep and wake-up data).

In some examples, the recommendation data is generated while the user consumes media content on a first over-the-top, OTT, service during the first viewing session. In some examples, the first media content item is consumed on a second OTT service, different from the first OTT service, during the second viewing session.

In some examples, the recommendation data comprises at least one of a sequel, a subsequent episode, a spin-off series, content in a similar genre, content other users are watching, most popular content, trending content, or the like.

In some examples, the method further comprises storing the recommendation data in local storage; and in response to detecting the loading event, retrieving the first media content from local storage. In some examples, the local storage is cache storage.

In some examples, the first media content item is at least one of a plurality of frames; a sound clip; an interactive poster; artwork; personalized artwork; or a combination thereof.

In some examples, the first media content item is displayed as an overlay on a user interface. further comprises reducing the size of the first media content item as a function of the completion of the loading event. In some examples, the first media content item has a minimum size. In some examples, the method further comprises detecting that the loading event has finished; and setting the size of the first media content item to the minimum size.

In another approach, there is provided an apparatus for displaying content to a user during a loading event, the apparatus comprises a transceiver module, control module and a display device, the control module is configured to: receive recommendation data from a recommendation engine; download, via the transceiver module, first media content item based on the recommendation data; detect a loading event; and in response to the loading event, display, on the display device, the first media content item.

In another approach, there is provided a non-transitory computer-readable medium having instructions encoded thereon for carrying out a method, the method comprising: receiving recommendation data from a recommendation engine; downloading the first media content item based on the recommendation data; detecting a loading event; and in response to the loading event, displaying the first media content item.

In another approach, there is provided a system for displaying content to a user during a loading event, the system comprises means for receiving recommendation data from a recommendation engine; means for downloading first media content item based on the recommendation data; means for detecting a loading event; and means for, in response to the loading event, displaying the first media content item.

In a second aspect of the invention, there is provided a method for a bidding process between over-the-top, OTT, platforms. The method comprises downloading media content items from a plurality of OTT platforms; detecting a loading event on a first OTT platform; broadcasting an available advertisement slot to the plurality of OTT platforms; receiving bid offers to display the downloaded media content items to a user; and displaying a first media content item with the highest bid during the loading event on the first OTT platform.

In some examples, the media content items are downloaded based on recommendation data from their respective OTT platforms. In some examples, the downloaded media content items comprise an indication of priority of the media content items to be displayed to the user, for automatic bidding during the broadcast of the available advertisement slot.

In some examples, the winning bid is from a second OTT platform, different to the first OTT platform. In some examples, the bid offers are further based on user profile data.

In some examples, the downloading of the media content items is during a first viewing session of the user, and the detection of the loading event is during a second viewing session of the user. In some examples, at least one of the downloaded media content items is not available for viewing at the first viewing session. In other examples, the method comprises ignoring the media content item with the highest bid if it is not available for viewing during the second viewing session OTT platform.

In some examples, the method further comprises automatically displaying a second media content item with the next highest bid, if the loading event on the first OTT platform has not yet finished.

In some examples, the method further comprises determining that the first media content item has finished being displayed; broadcasting a second available advertisement slot to the plurality of OTT platforms; and displaying a second media content item with the next highest bid during the loading event on the first OTT platform.

In some examples, the method further comprises storing the downloaded media content items in local storage; and in response to receiving a highest bid offer, retrieving the media content items related to the highest bid offer from local storage. In some examples, the local storage is a cache storage. In some examples, the downloaded media content items comprise at least one of: a plurality of frames; a sound clip; an interactive poster; artwork; personalized artwork; or a combination thereof.

In some examples, the first media content item is displayed as an overlay on a user interface, further comprising reducing the size of the first media content item as a function of completion of the loading event, such that the user interface becomes more visible the more completed the loading event is. In some examples, the first media content item has a minimum size, further comprising: detecting that the loading event has finished; and setting the size of the first media content item to the minimum size.

In another aspect there is provided an apparatus for a bidding process between over-the-top, OTT, platforms, the apparatus comprising a transceiver module, control module and a display device, the control module configured to: download media content items from a plurality of OTT platforms; detect a loading event on a first OTT platform; broadcast an available advertisement slot to the plurality of OTT platforms; receive bid offers to display the downloaded media content items to a user; and display a first media content item with the highest bid during the loading event on the first OTT platform.

In another aspect there is provided a non-transitory computer-readable medium having instructions encoded thereon for carrying out a method, the method comprising downloading media content items from a plurality of OTT platforms; detecting a loading event on a first OTT platform; broadcasting an available advertisement slot to the plurality of OTT platforms; receiving bid offers to display the downloaded media content items to a user; and displaying a first media content item with the highest bid during the loading event on the first OTT platform.

In another aspect there is provided a system for a bidding process between over-the-top, OTT, platforms, the system comprising: means for downloading media content items from a plurality of OTT platforms; means for detecting a loading event on a first OTT platform; means for broadcasting an available advertisement slot to the plurality of OTT platforms; means for receiving bid offers to display the downloaded media content items to a user; and means for displaying a first media content item with the highest bid during the loading event on the first OTT platform.

It should be noted that examples of the second aspect are compatible with examples of the first aspect, unless explicitly stated otherwise.

Accordingly, there are presented herein methods, systems, and apparatus for displaying content to a user during a loading event and, more particularly, to systems and related processes for communicating to various applications and platforms that an advertisement slot is available and, in some examples, provide a dynamic bid process for the slot. However, it should also be understood that the same methods, systems, and apparatus also apply to platforms that advertisements and the like, in general, apply to, and should not be thought to be limited to over-the-top platforms, per se. For example, the present disclosure would equally apply to mobile devices and applications thereon, such as gaming applications and loading screens, or the like.

BRIEF DESCRIPTION OF THE DRAWINGS

Embodiments of the invention are further described hereinafter with reference to the accompanying drawings, in which:

FIGS. 8 and 9 illustrate exemplary pseudo-code for flagging an available bid and priority of media content items in a manifest, in accordance with some embodiments of the disclosure;

DETAILED DESCRIPTION

OTT is short for "over-the-top," which refers to a method of media distribution that serves as an alternative to traditional satellite or cable television. We are entering a future in which most media is delivered and consumed via the internet. OTT technology is distributing more and more media each day. Some industry leaders advocate that we stop differentiating between OTT and broadcast TV entirely. An OTT streaming service is the application ("app") or website that viewers turn to access their favorite programs and movies. These services are accessible on all sorts of internet-enabled devices, including smart TVs, gaming consoles, computers, laptops, smartphones, and tablets. Typically, OTT streaming services limit access to paying viewers. Viewers can pay for access on a pay-per-view basis, or they can subscribe for unlimited on-demand access to the platform. Sometimes, broadcasters monetize their content with sponsored advertisements.

There are many OTT streaming services on the market. Some of these are niche services, and others have broader offerings and are geared towards a more general audience. Some focus on OTT live streaming and others only offer on-demand content. Most offer free content, premium content, or a mix of both. What all OTT streaming services have in common is that they all use the internet to deliver video content.

Figure 1:
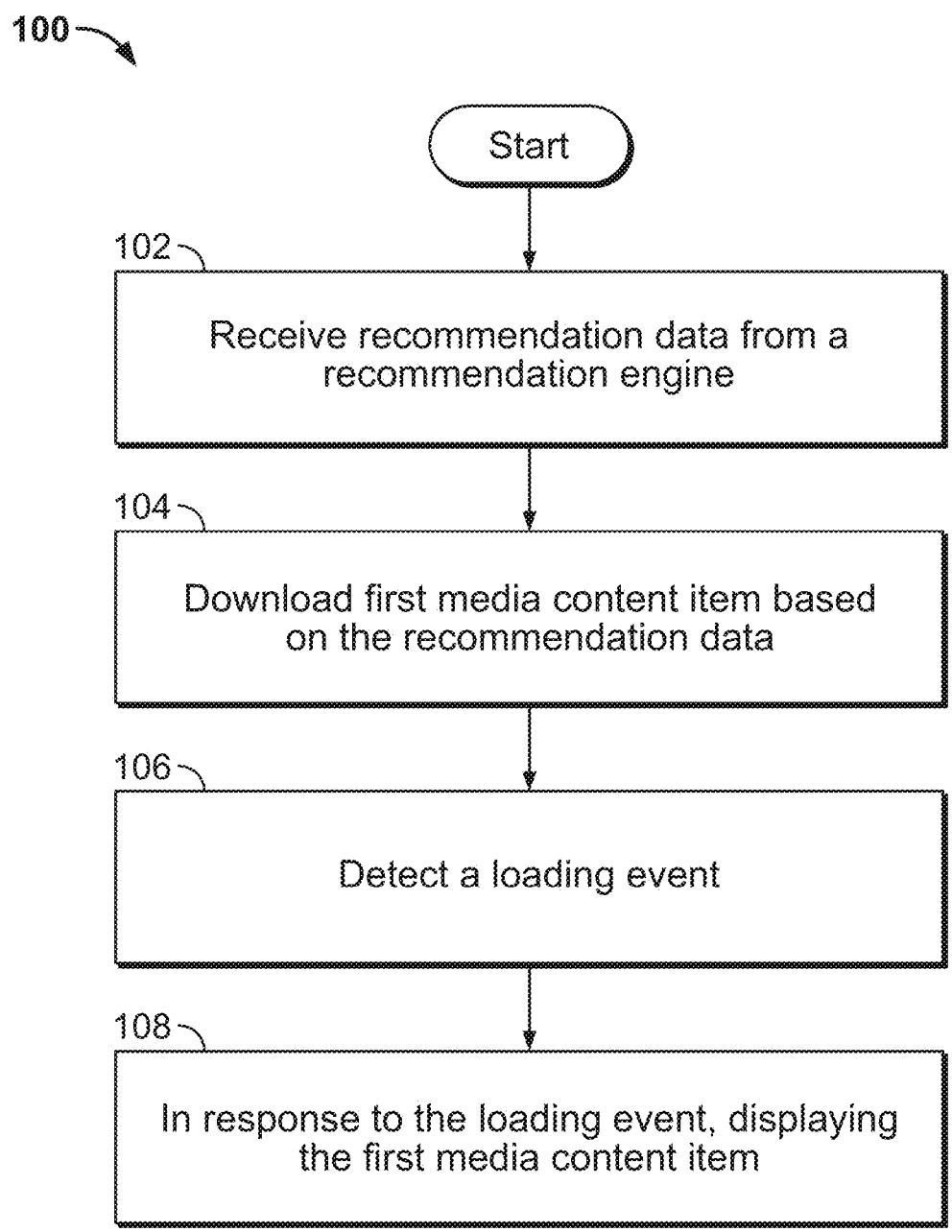
FIG. 1 illustrates an exemplary flowchart of the processing involved in displaying content to a user during a loading event, in accordance with embodiments of the disclosure.

FIG. 1 illustrates an exemplary flowchart of the processing involved in displaying content to a user during a loading event, in accordance with embodiments of the disclosure. Process 100 begins at 102. At step 102, recommendation data is received from a recommendation engine. In some examples, the recommendation data comprises a list of media content items and an indication of the priority of the media content items to be recommended to the user, and the first media content item is the highest priority media content to be recommended to the user. The recommendation data is generated while the user consumes media content on a first over-the-top, OTT, service during the first viewing session; by known means for recommending content to a user—such as those used on popular OTT platforms such as TikTok, YouTube, Netflix, and Prime Video; for example.

At step 104, a first media content item is downloaded based on the recommendation data. The first media content item may be a plurality of frames, a sound clip, an interactive poster, artwork, personalized artwork, or a combination thereof.

In some examples, the downloading of the first media content item is during a first viewing session, i.e., when the user is watching content on the OTT platform, and the detection of the loading event is during a second viewing session, i.e., when the user relaunches an OTT platform on a separate day, or at a later time on the same day. At step 106, a loading event is detected. The loading event may be loading the content of the OTT platform service, such as titles, images, descriptions, and the like of the media content available on the platform, as shown in FIGS. 5B, 6A, and 6B. The loading event may also be the buffering of media content the user was consuming on the OTT platform/service. The loading event may also be during data fetch, such as user profiles and media content after the user selects an application to launch on their smart device.

At step 108, in response to the loading event, the first media content item is displayed. In some examples, process 100 further comprises downloading a second media content item during the first viewing session, wherein the second media content item is the second highest priority media content to be recommended to the user. For example, the recommendation data may comprise a plurality of media content items that can be consumed during a second viewing session, each media content item having a priority ranking, based on either the user's watch history, a recommendation based on the popularity of content, or as configured by the OTT platform/service, to push content they want the user to consume—such as an advertisement.

In some examples, the list of media content items comprises media content that is not available for viewing at the first viewing session. For example, the system may be able to download a trailer that is not currently available for viewing, as the trailer has not been publicly released at that time. However, at a later time, i.e., during a second viewing session, the trailer may be publicly released and displayable to the user. Accordingly, process 100 may further comprise downloading a third media content item, that is not available for viewing at the first viewing session. In such examples, process 100 may further comprise determining that the third media content item is available for viewing during the second viewing session, determining that the third media content item has the highest priority out of the downloaded media content items, and displaying the third media content item during the second viewing session. In some examples, the media content item belongs to a movie which may not be available now but is expected to be available the next time the user logs in or it can be a promotion of future content that is highly relevant to the viewer (e.g., coming soon content).

In some examples, and as will be described in more detail below with reference to FIGS. 7 to 9, the first media content item may be consumed on a second OTT service, different from the first OTT service, during the second viewing session. In addition, in some examples, process 100 further comprises storing the recommendation data in local storage; and in response to detecting the loading event, retrieving the first media content from local storage. For example, the user may have watched a series on Netflix during a first viewing session, but then launches Prime Video the next day to watch a movie; during the loading of Prime Video, a media content item for a subsequent episode of the series on Netflix can be retrieved from local storage a displayed to the user while the loading event continues. The local storage may be cache storage, that is quick to access and requires no user interaction to retrieve.

Figure 2:
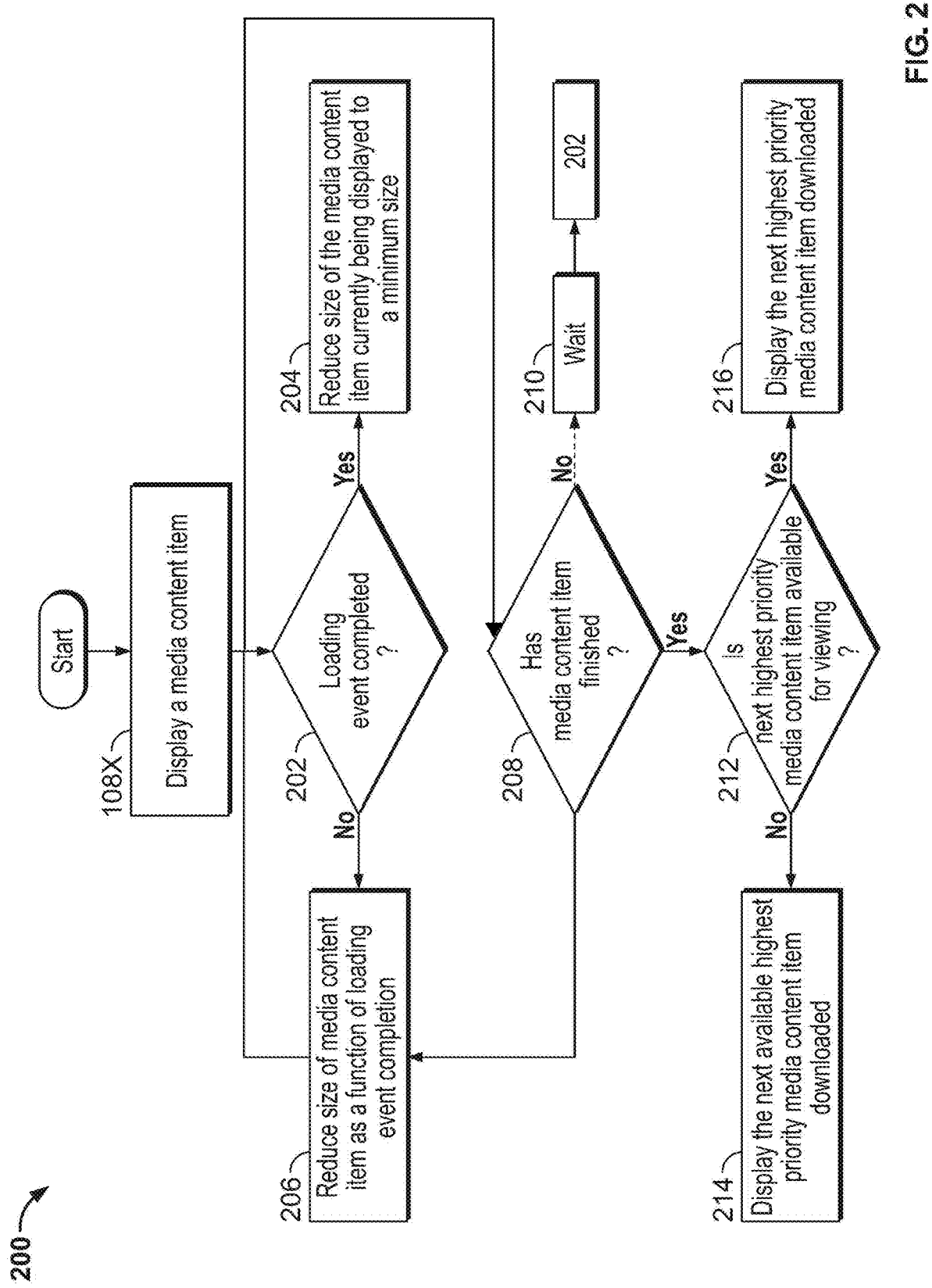
FIG. 2 illustrates an exemplary flowchart of the processing involved in determining when to download content to be shown to a user during a loading event, in accordance with embodiments of the disclosure.

FIG. 2 illustrates an exemplary flowchart of the processing involved in determining when to download content to be shown to a user during a loading event, in accordance with embodiments of the disclosure. Process 200 may be incorporated into other processes herein, such as process 100. Alternatively, process 200 may be carried out in parallel to the processes herein, such as, again, process 100.

Process 200 begins after, for example, step 108 of process 100 or similar. Process 200 is shown as starting after step 108X, wherein a media content item is displayed (not necessarily the first media content item, just a media content item as process 200 applies to any N media content items). At step 202, it is determined whether the loading event has been completed or not. If the answer to step 202 is no, process 200 continues to step 206. At step 206, the size of the media content item currently being displayed is reduced as a function of loading event completion. If the answer to step 202 is yes, then process 200 continues on to step 204. At step 204, the size of the media content item currently being displayed is reduced to a minimum size. After step 204, process 200 ends. After step 206, process 200 returns to step 202. In some examples, a waiting period is initiated after step 206 before process 200 returns to step 202 (not shown).

After step 202, process 200 continues to step 208. Step 208 may be performed in parallel to step 202. In step 208, it is determined whether or not the media content item has finished being displayed. If the answer to step 208 is no, process 200 continues to step 210. At step 210, an optional wait period is initiated before process 200 reverts to step 202. Step 208, also provides information to step 206, as will be described below with reference to FIGS. 5A and 5B. If the answer to step 208 is yes, process 200 continues on to step 212.

At step 212, process 200 determines whether or not the next highest priority media content item in the list of media content items (i.e., the recommendation data) is available for viewing. If the answer to step 212 is no, process 200 continues to step 214. At step 214, the next available highest priority media content item downloaded is displayed. If the answer to step 212 is yes, process 200 continues to step 216. At step 216, the next highest priority media content item downloaded is displayed.

In some examples, process 200 further comprises detecting the application response time (e.g., if a delay is anticipated and known) and using that information to select a media content item. For example, a plurality of media content items could be precached and tagged as primary, secondary, high priority, low priority, etc. The primary item might be a poster, while the secondary item can be a series of frames that equates to a short video snippet. The selection of the appropriate precached item can be based on global usage of the app/service at a particular time or known usage patterns, known or reported downtimes issues, or an approximate time value from an API gateway. Additionally, signal strength (e.g., Wi-Fi signal strength) can be a factor, or the available bandwidth at the user device when launching the application—anything that is known to potentially increase the launch time (i.e., the loading event time) of an application, platform, or service.

Figure 3:
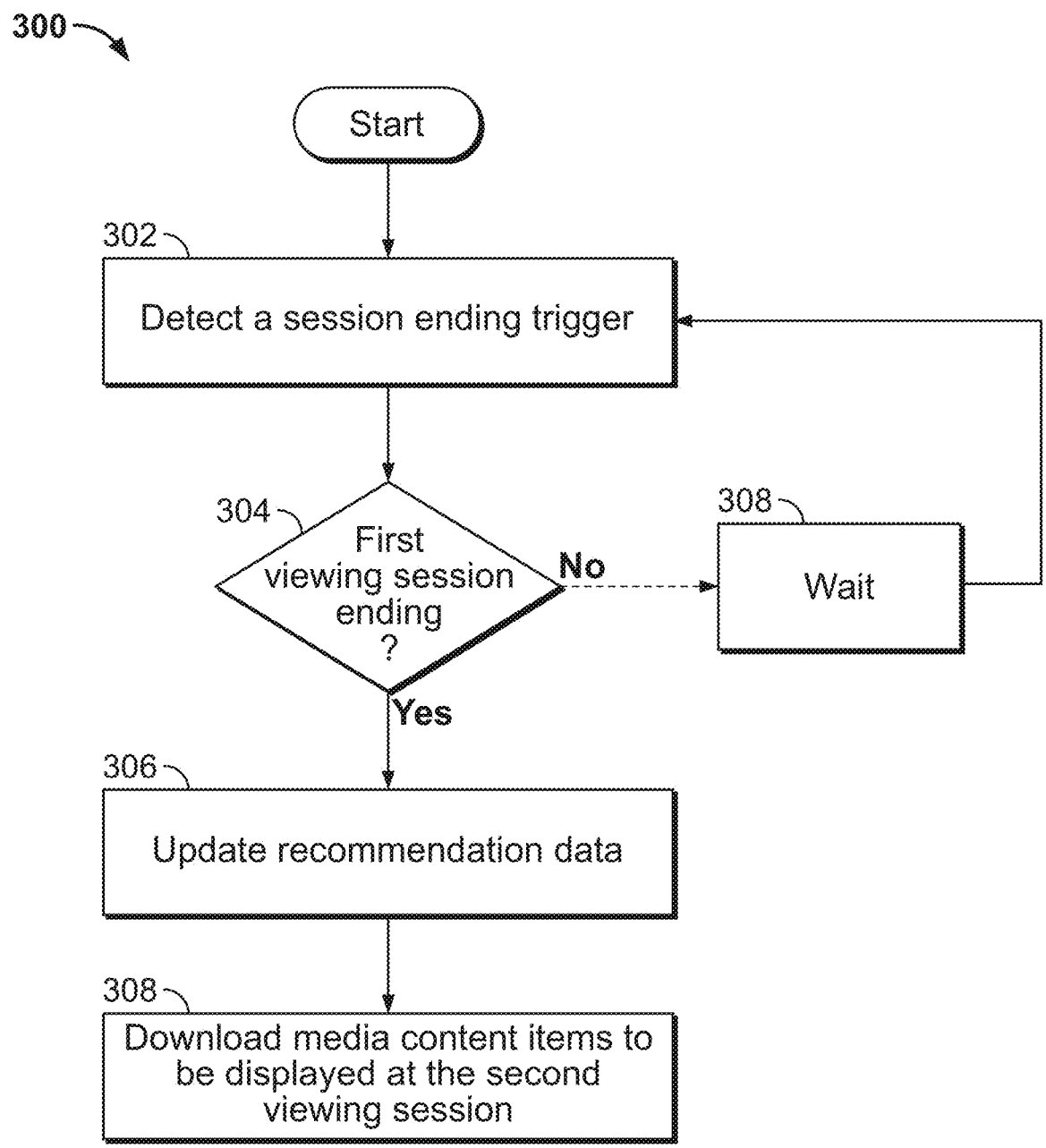
FIG. 3 illustrates an exemplary flowchart of the processing involved in updating media content to be displayed during a loading event, in accordance with embodiments of the disclosure.

FIG. 3 illustrates an exemplary flowchart of the processing involved in updating media content to be displayed during a loading event, in accordance with embodiments of the disclosure. Process 300 may be incorporated into other processes herein, such as process 100 or process 200. Alternatively, process 300 may be carried out in parallel to the processes herein, such as, again, process 100 or 200. Process 300 starts at step 302.

At step 302, a session-ending trigger is detected. For example, the system may track a user's watching pattern and decides if they are about to exit the streaming service. In such examples, the trigger may be getting to the end of a move, approaching the time the user goes to bed (e.g., based on phone sleep and wake-up data), or data around viewing habits (e.g., the user exits the app after watching one movie or one episode of a show).

At step 304 it is determined whether or not the first viewing session is ending. For example, the system may look for more information to validate the trigger, such as calendar information, viewing habits, or those mentioned above. If the answer to step 304 is no, a waiting period is optionally initiated before process 300 reverts to step 302. The waiting period, as all wait periods herein, is user configurable. However, by default, the waiting period is likely to be a couple of seconds long, as the loading events are often in the order of fewer than 10 seconds.

If the answer to step 304 is yes, process 300 continues to step 306. At step 306, the recommendation data is updated. For example, a dedicated recommendation/cross-app advertising microservice pushes (e.g., downloads in the background) recommendation data. In another example, the system may make a request to the OTT service for the latest recommendation data (e.g., the recommendation data, updated with the viewer watch history from the current viewing session). Upon receipt of the latest recommendation data, the system can check to see if the recommendations have been updated, update the local recommendation data, and store said data.

At step 308, media content items are downloaded to be displayed at the second viewing session. For example, media content items (e.g., artwork, personalized artwork, short snippets of consecutive frames, etc.) based on the recommendation data (e.g., a sequel to a movie, or a subsequent episode of a series), are downloaded to be viewed during a next viewing session (i.e., a second viewing session), in particular during a loading event. The media content items that are downloaded are stored in local storage. The media content items are preferably a media content item that the service intends to recommend to the user at the next viewing session and when the user accesses the service next, based on the various weights assigned to these items/relevance to the user.

It is important to note that media content items (i.e., the pre-cached content) can be replaced in the background since it can be associated with an expiration time or the replacement can be a trigger in response to an update to a catalogue (e.g., items were removed from the service, new releases or more relevant content was added, etc.). For example, the trigger may be that the bandwidth the user is using to watch media content has fallen (i.e., the media content they are consuming on the OTT platform has been fully buffered) so a determination can be made about the available bandwidth before downloading the media content items. In some examples, watching content, skipping content, rating content or the like on the platform can be a trigger to update the recommendation data. In some examples, the trigger may be that items were removed from the service, new releases or more relevant content was added, or the like.

Figure 4:
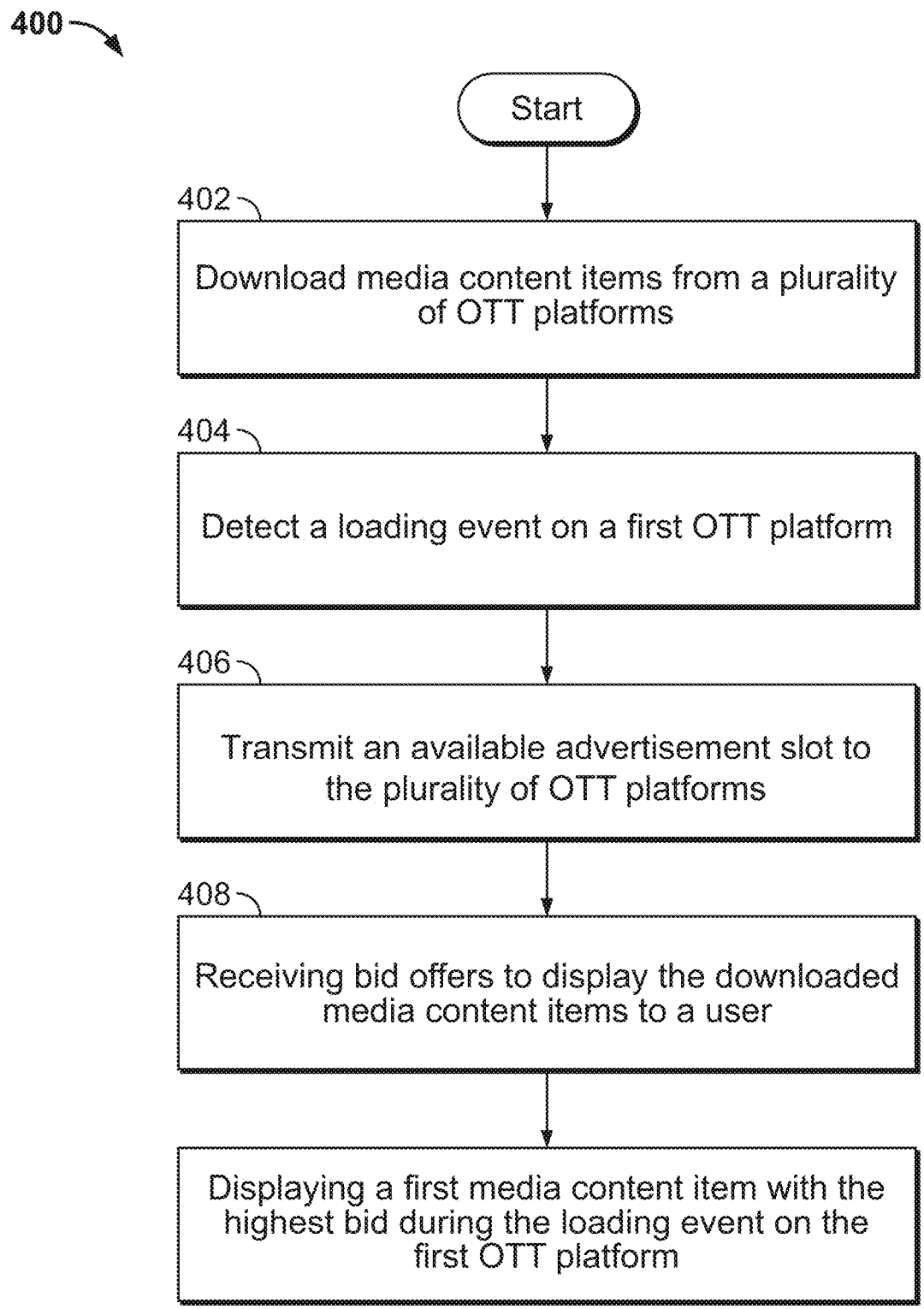
FIG. 4 illustrates an exemplary flowchart of the processing involved in a bidding process for an advertisement slot, in accordance with embodiments of the disclosure.

FIG. 4 illustrates an exemplary flowchart of the processing involved in a bidding process for an advertisement slot, in accordance with embodiments of the disclosure. Process 400 may be incorporated into other processes herein, such as process 100 or process 200. Process 400 starts at step 402. At step 402, media content items are downloaded from a plurality of OTT platforms. At step 404, a loading event is detected on a first OTT platform. At step 406, an available advertisement slot is broadcast to the plurality of OTT platforms. At step 408, bid offers to display the downloaded media content items to a user are received. At step 410, a first media content item with the highest bid is displayed during the loading event on the first OTT platform. More detail on the real-time bidding process is provided below with reference to FIGS. 7-9.

Figure 5A:
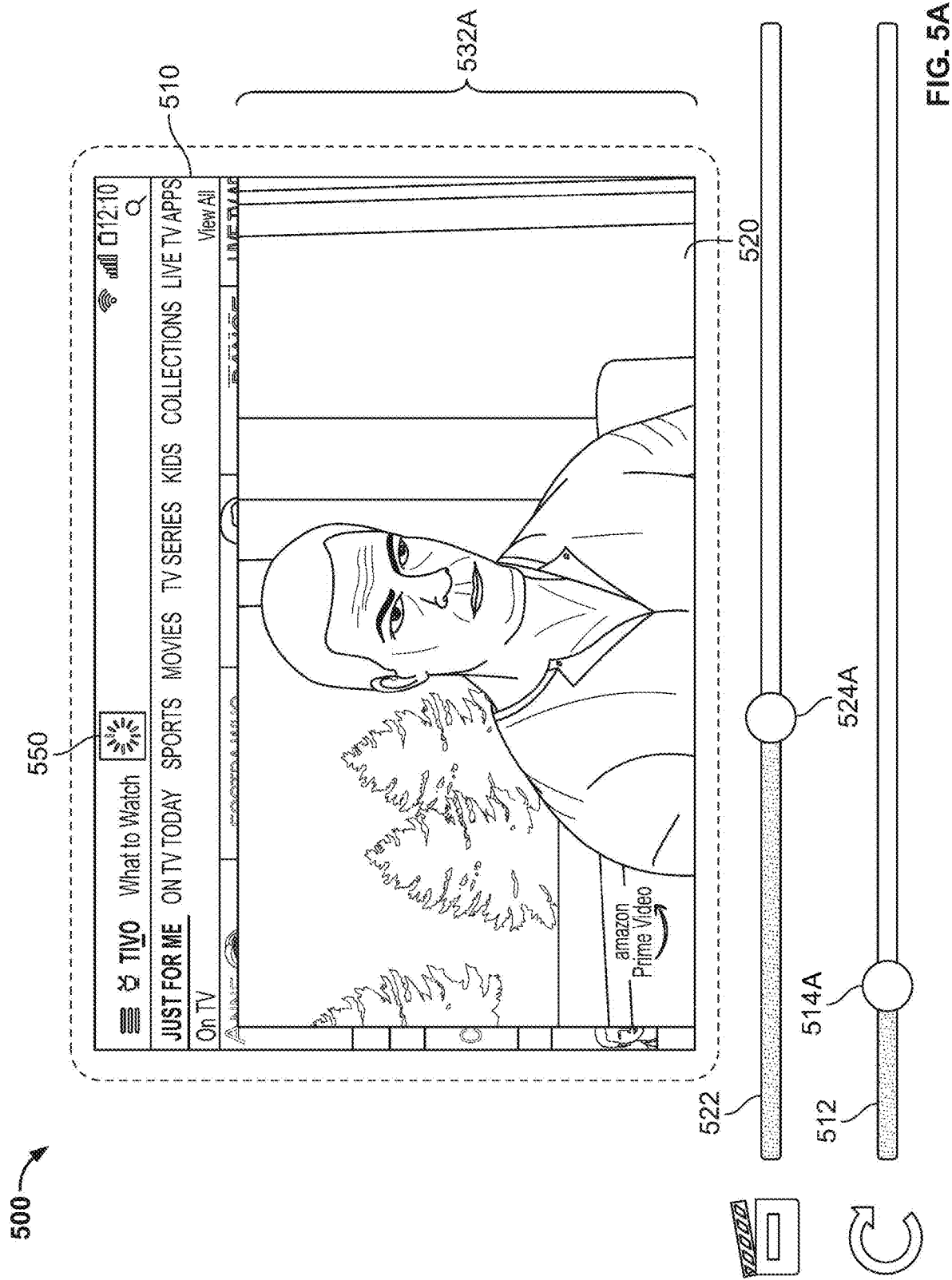
FIGS. 5A and 5B illustrate the reduction of the size of a first media content item as a function of loading event completion, in accordance with embodiments of the disclosure.
Figure 5B:
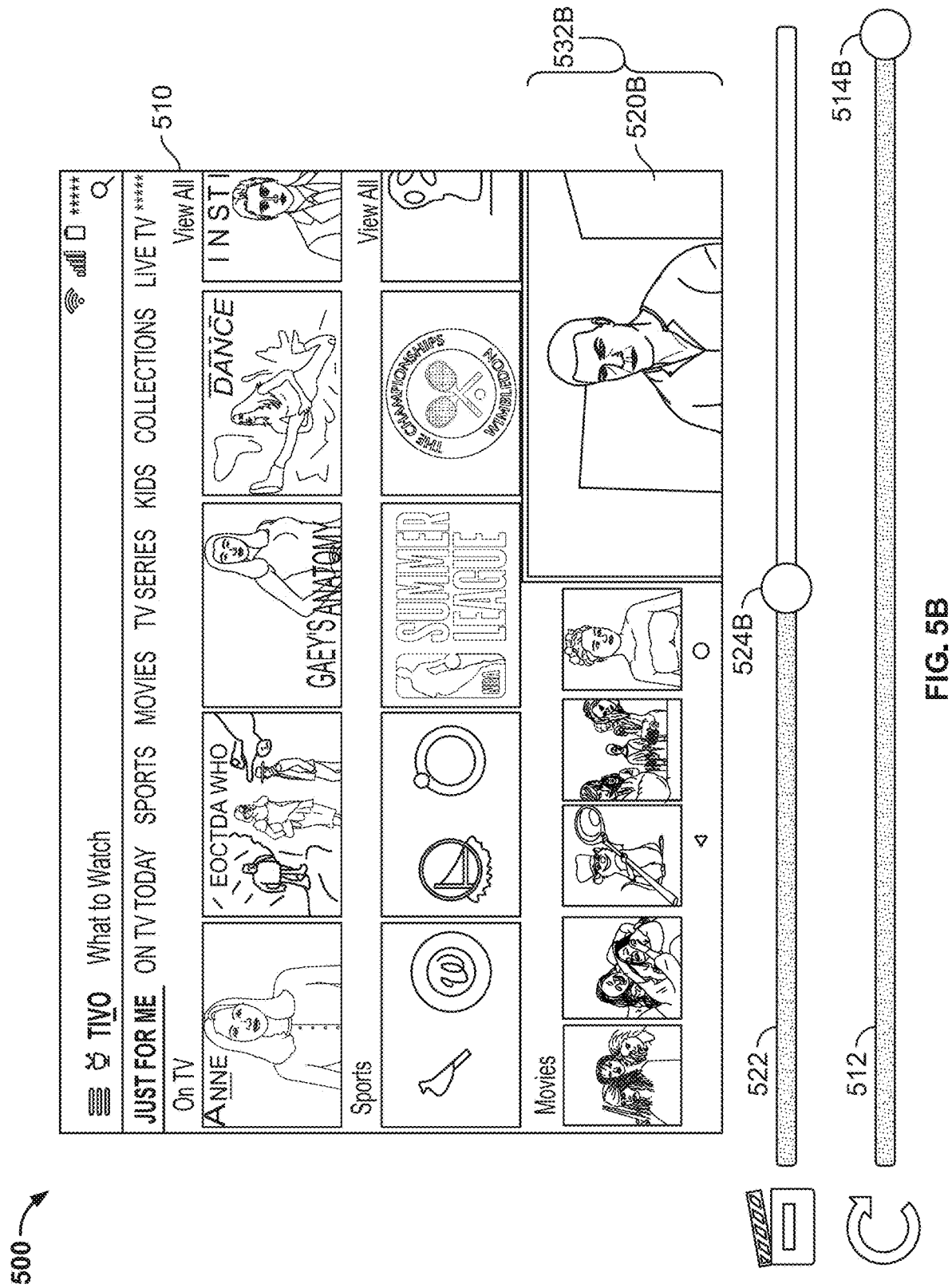
Figure 6A:
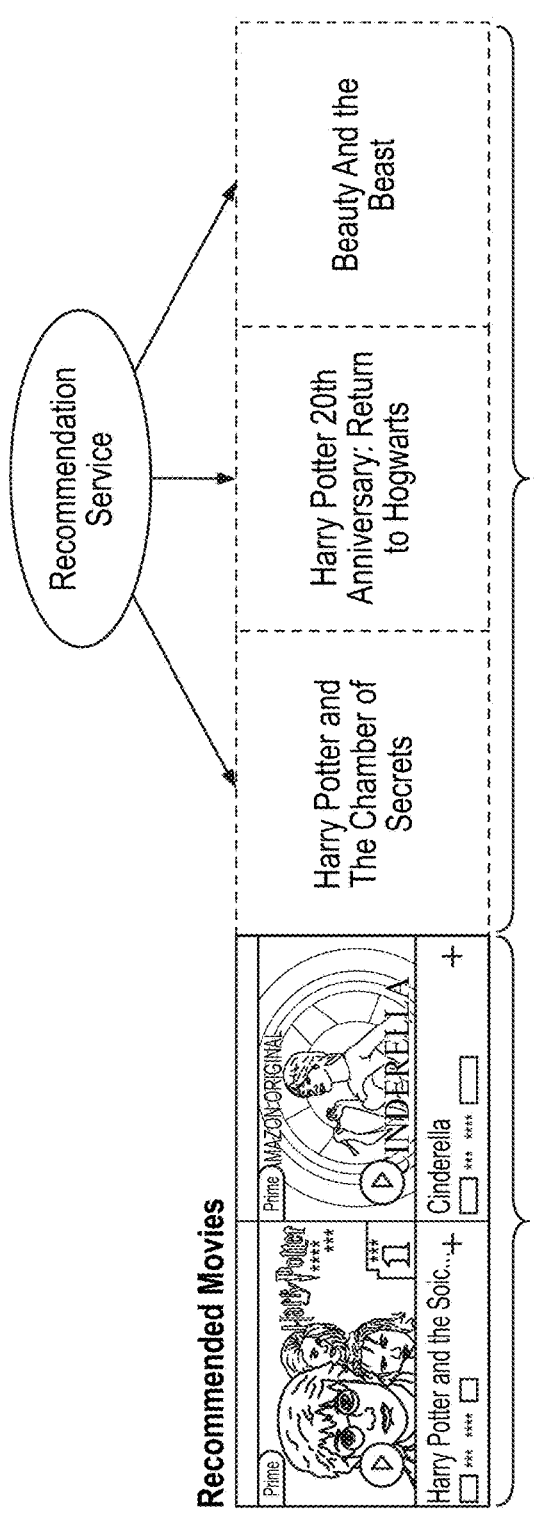
FIGS. 6A and 6B illustrate a scrollable tile wheel on an OTT service, in accordance with some embodiments of the disclosure.
Figure 6B:
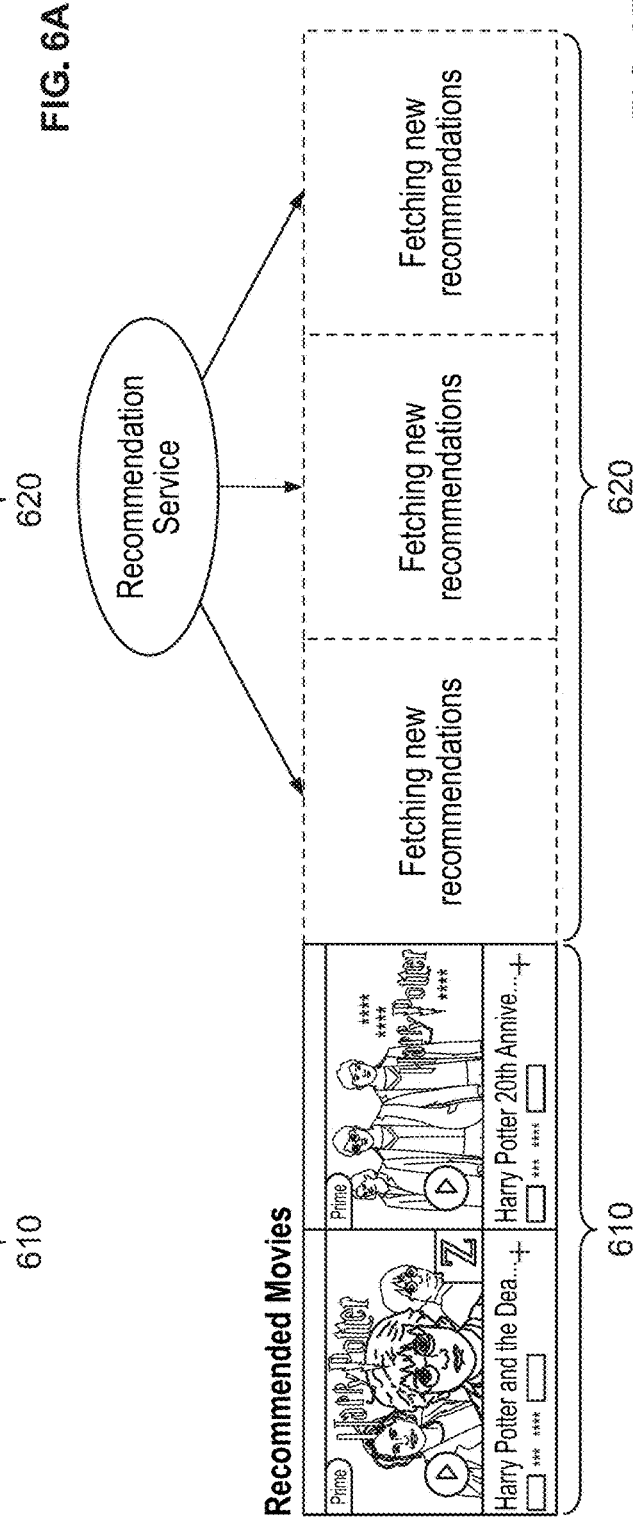

FIGS. 5A and 5B illustrate the reduction of the size of a first media content item as a function of loading event completion, in accordance with embodiments of the disclosure. As shown in FIG. 5A, the user interface 500 of an OTT service, such as a set-top box, is displaying the "What-To-Watch" page 510 and a media content item 520. The What-To-Watch page 510 is currently loading and populating the page with information for the user to consider. The progress of the loading event is shown by progress bar 512, and the current progress is shown by indicator 514A.

In this example, the media content item 520 is a trailer for an upcoming show the user has a subscription to, accessible through their set-top box. The progress of the first media content item, the trailer, 520 is shown by progress bar 522, and the current progress is shown by indicator 524A. As shown, the loading event progress 512 is less than the media content item progress 522. Accordingly, the size 532A of the media content item is relatively large and takes up the majority of the user interface 500, overlaid over the What-To-Watch page 510.

FIG. 5B the loading event is now completed, as shown by indicator 514B reaching the end of progress bar 512. However, the trailer, i.e., the first media content item 520, is still playing and is only about halfway, as shown by progress bar 522 and current progress 524B. Accordingly, the size 532B of the media content item is now reduced to a minimum size 520B, such that the user can freely interact with the user interface 500 and still consume the media content item.

The progress bars 512 and 522 are shown here for illustrative purposes and are not intended to be displayed on a user display device, although this is possible and in some examples encourages conveying to the user that the requested page "behind" the media content item is still loading.

When the user first selects an application, or in this instance turns on the set-top-box, the size of the media content item 532A may be displayed at fullscreen (i.e., 100% size). As the user interface is loaded, or in this instance, "What-To-Watch", the size 532B of the media content is reduced proportionately to the loading progress. For example, the preview window may be reduced to 60% when all the tabs of What-To-Watch are loaded, then further reduced to 20% (i.e., a minimum) when all the contents of What-To-Watch are fully loaded.

It is important to note that the playing of the media content items (also known as pre-cached content) does not take any network bandwidth to select, retrieve and display on the user device. Furthermore, the pre-cached content can be replaced or updated, or the priority order of playing can be updated in the background since it can be associated with expiration timers or the like, in the metadata of the pre-cached content.

Therefore, the first media content item may be displayed as an overlay on a user interface, and a process, such as processes 100-300, may further comprise reducing the size of the first media content item as a function of the completion of the loading event, such that the user interface becomes more visible the more completed the loading event is. The first media content item has a minimum size and said processes may comprise detecting that the loading event has finished, and setting the size of the first media content item to the minimum size.

By way of example, consider a scenario where a user watched "Jack Reacher" and "Jack Reacher: Never Go Back" movies back-to-back on an OTT service, such as Amazon Prime. The system will determine that the user likes the Jack Reacher character as he watched both Jack Reacher movies and very likely will enjoy watching the "Reacher" TV series as well. So, when the user is towards the end of watching "Jack Reacher: Never Go Back", i.e., near the end of the first viewing session, it stores a few frames related to the "Reacher" TV series, e.g., a trailer for the Reacher TV series. At the next viewing session, when the user launches the Prime Video application, instead of showing any loading icon or static screen, it can the stored frame relating to the "Reacher" TV series from local storage. The few frames of "Reacher" shown to the user are shown as a picture in picture format with a diminishing window size of preview, based on the completion of the loading event. Consider an app being launched with What-To-Watch as the initial user interface screen. At the start of the app launch, the preview can occupy around 80% of the screen size. When the screen is being loaded, a small spinner 550 can be displayed on the screen to indicate to the user that the content is loading. The preview gets reduced to 60% when it gets the details of tabs in the What-To-Watch screen are retrieved and further reduced to 40% when API retrieves popular content and to 20% when the titles, descriptions, and posters get loaded. The first media content item may not be finished, which the user can dismiss if desired and move on to the content that is now loaded.

FIGS. 6A and 6B illustrate a scrollable tile wheel of an OTT service, in accordance with some embodiments of the disclosure. Typically, a user of an OTT service is present with scrollable menus that are loaded after the user interacts with them, or at least further detail is downloaded after the user interacts with the menu. For example, after loading the What-to-Watch page of the user interface, the user may be present with recommended movies 610, and, upon scrolling through the recommended movies interface, a plurality of recommended service items 620 would be visible. OTT platforms and services behave in this way as it is wasteful to download all the content on the menus in the first instance, in particular, if the user just selects one of the recommended movies 610. Therefore, the recommendation data comprising the next movies to recommended 620 are never fully retrieved. In the present disclosure, these content items can be retrieved and stored to make up the media content items stored locally, to be displayed during a loading event. That is to say that the recommendation data referred to herein may contain one of the items on the user's recommendation row from a particular OTT service. Such items can also be items that are available from a different OTT provider.

The next time a user launches the OTT app, instead of displaying the loading indicator or any static images, the pre-cached content or a portion of it can be retrieved from the cache and displayed. For example, the precached content can be a poster of movie or a series of frames (e.g., I-frames selected from an I-frame or key-frame only playlist). The movie or content item associated with the poster or frames can be highlighted to the user once the main page of the app (e.g., the Home page) is loaded. Such items can be placed on the masthead of the page (e.g., where previews automatically get played). Additionally, the playback service can utilize such data to prefetch segments related to the advertised item to enable fast playback without any buffering and therefore improve the user's experience.

Figure 7:
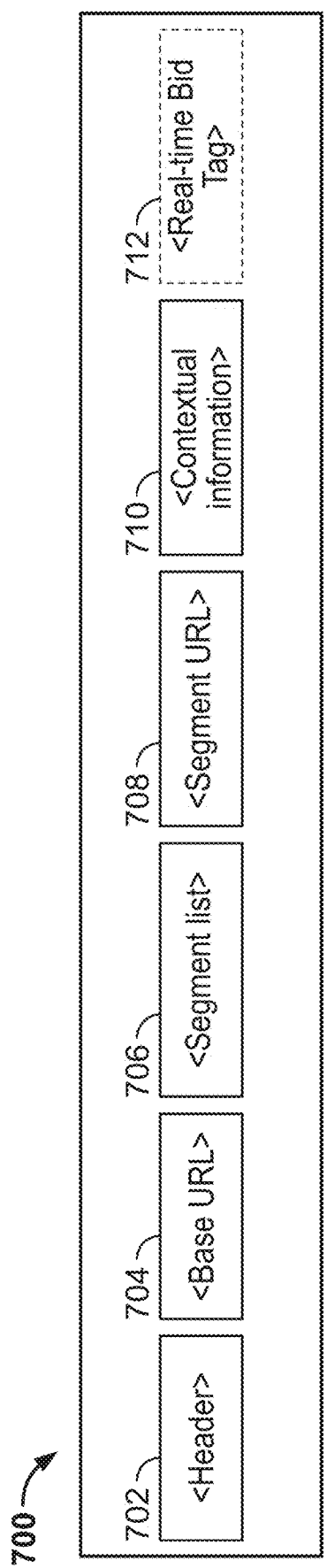
FIG. 7 is a pictorial representation of an exemplary manifest, in accordance with some embodiments of the disclosure.

FIG. 7 is a pictorial representation of an exemplary manifest 700 of an over-the-top system, in accordance with some embodiments of the disclosure. In the exemplary manifest 700, there is provided a header 702, base URL 704, segment list 706, segment URL 708, contextual information 710, and, in some examples, a real-time bid tag 712. In some examples, an OTT service (Service A) promotes its exclusive content to a person that is launching an application associated with another service, e.g., Service B. For example, the user launches an application, service B, that can advertise locally stored media content items by communicating with various applications the user has access to on the device, or perhaps does not have a subscription for yet (such architecture is known). The application, service B, advertises to the other applications an available "app launch spot." Hence, advertisement retargeting can take place from one application/platform, service A, on another application/platform, service B.

The media content items downloaded from the recommendation data and stored locally can be shared directly from the source application/platform or can be hosted on a server and associated with a user profile related to the user, where the application offering the advertisement slot, service B, can fetch the media content items.

The manifest 700 is a container file for chunks of data that provide a user OTT service/platform with the information required for displaying content to a user during a loading event, in particular, but not limited to, after the user launches a platform/application to request a video or audio resource (e.g., a TV show, movie, series, a user created content or the like). As shown in FIG. 7, a manifest 700 starts with a header 702 and then contains a series of data blocks (702-712). In some examples, the header of the manifest identifies the format that the manifest is in (e.g., HTML, XML, or the like) and/or what adaptive bitrate technology the manifest relates to (e.g., DASH, HLS, or the like). In some examples, the header can be omitted from being present within manifest 700 because the format of the manifest 700 can be indicated by the filename extension suffix (e.g., ".xml," ".m3u8," ".txt," or the like), or a footer (not shown in FIG. 7, but included in the exemplary pseudo-code shown in FIG. 8).

In some examples, the data blocks of a manifest may comprise a block indicating a base URL 704, a Segment list 706, a segment URL 708, contextual information 710, and a real-time bid tag 712. Other examples of data blocks include media type, representation blocks, ID tags, file names, initialization sources, subtitles, and fallback sources (e.g., failover URLs).

In some examples, a data block may be a base URL 704 for signaling the base URL that all resources to follow will be obtained from. For example, the base URL 704 is the first part of a website URL such as "http://video.platform.com/v1." It is this base URL that later described segment URLs will be concatenated onto. Like any of the data blocks 704-712, the Base URL 704 may comprise any text or character with an equivalent Unicode Code Point. In some examples, Base URL 704 may be unique to the whole manifest that all subsequent URLs, such as Segment URL 708 are concatenated onto.

In some examples, a data block may be a segment list 706. In some examples, Segment list 706 may further comprise a segment reference, for example, a range of frames to obtain (e.g., range="0-862"), a start and end time to obtain (e.g., 1253s to 1258s), or a segment reference ID (e.g., "segment 12"). In some examples, the segment list 706 further comprises a bitrate variant reference ID or tag. In some examples, the segment list 706 with a range of frames to obtain is referred to as a media range. In some examples, there may be a minimum duration that the segment list 706 indicates. For example, a minimum duration of 4 seconds to obtain as a segment, although any period may be chosen as a minimum duration.

In some examples, a data block may be a segment URL 708. As mentioned briefly above, segment URL 708 is a suffix to be added to the base URL by the user content player to complete the URL to a particular segment. In other words, base URL 704 and segment URL 708 together make the complete URL to any particular media content item contained within the manifest. In some examples, the whole URL per segment or bitrate variant is displayed in the segment list 706; however, this is often unnecessary as clogs up the manifest with a lot of repetitive data. In the concatenating examples, the overall manifest file size is kept to a minimum, reducing unnecessary overheads in the manifest file.

The manifest 700, may further comprise a data block that represents contextual information 710. In some examples, the context tag 710 is used to provide context to any one or more of the header 702, base URL 704, segment list 706, segment URL 708, or real-time bid tag 712. The contextual information 710 may be a contextual tag that the logic of an OTT service/platform can interpret. The contextual information may represent language, subject matter, and segment metadata. Segment metadata includes, for example, codecs, audio tags, video tags, version numbers, encoding information, bandwidth markers, resolution or size of media content, or file names. In some examples, the context tag 710 is configurable by the user or is configured by a user profile of the user, which can be obtained by control circuitry. For example, a user profile linked to the user content player may configure the context tag to always select the OTT service recommended media content item or a media content item that is most relevant to the content the user watched last.

In some examples, the data blocks 704-710 as described above further comprise meta-data. In some examples, contextual information block 710 may further comprise rules on what media content items to fetch. The start time, end time, and segment reference as discussed with reference to segment list 706 are considered an example of meta-data of the segment list 706 data block, for example. One example of meta-data is the type of content to fetch to be advertised to the user when experiencing a loading event.

In some examples, the real-time bidding information, for other services, such as service A, to bid to advertise their content to the user is provided by an additional data block within the manifest 700, the real-time bid tag 712. In some examples, the real-time information may be embedded into any other of the header or data blocks 702-710, as will be described in more detail below with regard to FIG. 8.

Subtitles are also considered to be meta-data of the manifest 700, subtitles are often provided in a format known as Web Video Text Tracks (WebVTT), which is a World Wide Web Consortium (W3C) standard for displaying timed text in connection with the HTML5<track> element. Other common caption formats include XML-based Timed Text Markup Language (TTML) and the "SubRip" file format. The timed text refers to the presentation of text media in synchrony with other media, such as audio and video. Therefore, all timed text formats should be considered as falling within the scope of the methods and embodiments herein. While different timed text formats are compatible across a number of different devices and browsers due to their slight differences, all these formats contain text information to be displayed alongside a media asset such as audio, video, or a combination of both.

Any data blocks 702-712 which are not understood by legacy media asset players, due to the fact they have not been updated to read such data blocks, would be ignored. Therefore, in some examples, the manifest 700 is backwards compatible with legacy user content players. Data blocks 702-712 may be separated by lines, commas, semi-colons, special characters, or any other common choices of the syntax used in computing languages such as C++, C #, Python, R, Java, JavaScript, HTML, and the like.

Real-time bidding (RTB) can occur upon the detection of an application launch (e.g., an application is tapped or selected). The bidding can occur in real-time especially for advertised app launch spots that are short, for example, in response to a loading event (e.g., buffering a current TV show or movie, or the loading of a user interface). The plurality of services/platforms each having pre-cached content downloaded based on recommendation data as described above, is preferred. Service A can push the content directly to the advertising service B and that content gets tagged, with a real-time bid tag, by the system for use when service B is launched. In some examples, a relationship association (e.g., parent-to-child, child-to-parent), which is handled by the OS or system (e.g., the OS is the gatekeeper that validates and allocates content to various applications/platforms folders or locations) based on signaled authorization in an appropriate header 702. A similar model is used on live TV today—where a show on Channel A is promoted to viewers watching Channel C. However, these methods are not applicable to individuals with unique recommended content. Therefore, some OTT services can use this as yet another channel to promote content available on other services.

By way of further example, the platform associated with Service A can request to advertise an ad placement for movie lovers that enjoy thriller and crime movies on another service, Service B, that is popular (e.g., has a high number of unique visitors) on a particular device or device ID. If service A wants to promote such content to such users (e.g., to get them to download the app, subscribe to their service, or even use their service more), then it could 'bid' on the placement and 'win' the spot (i.e., the app launch spot). In this case, the system requests/retrieves the appropriate media content item (e.g., stills, icons, or whatever content it wants to present) from Service A (e.g., in local storage or from the servers of service A) so that it gets displayed on the user's device, in particular when the other app is launched.

This embodiment is not restricted to OTT content and can apply to the content offered by various apps that the user has installed on their device (e.g., Amazon, Safeway, Domino's Pizza, etc.) This can help apps reach users who have been absent from the service. For example, a Netflix subscriber that was watching Narcos on the Netflix app and may have not launched the Netflix app for a while would allow Netflix to present a poster of the show during a particular app launch spot for another service, during a loading event, such as the Dominos app.

Retargeting as described in the present application is different from retargeting known in the art for several reasons. For example, it is based on Screen Time, Content services, and can be limited by user-wide Privacy Restrictions. That is to say that app usage on a user device is typically readily available but requires authorization to be accessed (just like any other app that requires the user to authorize access to location, microphone, camera, etc.). It is based on the settings of the app that is being targeted with an advertisement during app launch; more specifically, a particular app launch instance can be associated with a profile that has content restrictions involved (e.g., access restrictions with respect to day/time or total duration of time that the app can be used every 24 hours, access restrictions with respect to content that can be browsed and played back—such as a parental control feature that is associated with the particular profile).

The retargeting in the present application also takes into account application "popularity" with respect to the other apps that are installed on the user's device. A Netflix app might be more popular on device A than on Device B, based on access/usage data. A manifest such as manifest 700, which may be an application manifest, includes a list of apps sorted by popularity and can be provided to the ad service to construct an app launch spot. This list is dynamic and reflects the user's app usage habits (for example, the user hasn't used TikTok in a while, but that user has increased their usage of YouTube in the last few days significantly). Any restrictions associated with the apps can also be listed in the user-device app-specific manifest 700, as contextual information 710. Such information is accessed by the ad service; the ad service could be a broker that is managed by the device vendor (e.g., Apple). The device acts an intermediary between the various apps (in a similar way to how the current user devices act as an intermediary between app-push notifications and users).

In addition, in some examples wherein the advertisement system is based on a managed device, the system can monitor the user's actions on one OTT/platform/application, service A, and determine that the user has been surfing the app for some time, didn't find the content of his liking and is about to exit the app. Based on historical data, the system can determine that the user is going to OTT/platform/application, service B. Therefore, the system prefetches the recommendations data and the media content items for service B even before the user initiates the launch of Service B. By the time user launches service B, the latest recommendations are already available in cache and can be immediately displayed to the user.

FIG. 8 illustrates exemplary simplified pseudo-code for an adaptive bitrate manifest, in accordance with some embodiments of the disclosure. FIG. 8 is considered to be the exemplary implementation of manifest 700 as described previously with reference to FIG. 7 but is non-limited in its specific structure and syntax.

FIG. 8 shows a manifest 800. In manifest 800 there is provided with a header 802, a base URL 804, first contextual information 810, a first segment list 820, second contextual information 830, a second segment list 840, comprising first and second segment URLs 842 and 844, a footer 850.

The manifest 800 is a container file, usually comprising lines of instructions to be carried out by a user device, application, or OTT service provider. The manifest 800 may be generated by an OTT service provider in response to the launching of a service, application or platform on a user device. In particular, manifest 800 starts with a header 802 comprising lines 0 and 1 of the pseudo-code. In this example, the header informs the user device of the version and encoding formats of the manifest 800 and includes some reference sources for information. The user device may be a web browser, media player, application on a smartphone, smart TV, or another device.

The manifest 800 comprises a base URL 804 in line 2. The base URL 804 is "http://video.platform.com/v1" and is shown between two tags, indicating the base URL 804 to the user device.

Lines 4 and 10 comprise first and second contextual information 810 and 830. The first contextual information 810, shown on line 4 of FIG. 8, comprises a contextual tag that indicates the following lines comprise information relating to English audio. The second contextual information 830, shown on line 10, comprises a contextual tag that indicates the following lines comprise information relating to the video. The user device can therefore identify the lines following the first and second contextual information 810 and 830 as such.

Manifest 800 comprises a first segment list 820. First segment list 820 follows the first contextual information 810 on line 4, therefore the user content player will understand that the first segment list 820 is a segment list for audio, in particular, lines 5 to 9 of manifest 800 provide the information required for the user device to obtain the audio contained within the base URL 804. In some examples, the user device concatenates the base URL 804 with the segment URL found within the first and second segment lists 820 and 840 to obtain the full URL where the media content item can be found.

Manifest 800 comprises a second segment list 840, comprising first and second segment URLs 842 and 844. The media content item that manifests 800 comprises the URLs for the user content player to obtain and comprises multiple bitrate variants. In particular, a bitrate variant is contained within the first segment URL 842 requiring a bandwidth of 1 Mbit/s (megabits per second) that has a resolution of 2160×1440 pixels per square inch, as shown in FIG. 8 in the metadata of lines 11 to 14. A second bitrate variant is contained within the second segment URL 842 requiring a bandwidth minimum of 2 Mbit/s that has a resolution of 3840×2160 pixels per square inch as shown in FIG. 8 in the metadata of lines 15 to 17. The first and second segment URLs 842 and 844 point to a video titled "BigNewMovie" encoded with advanced video coding (AVC) also referred to as H.264 or MPEG-4 Part 10, Advanced Video Coding (MPEG-4 AVC), this may be a trailer for a new movie that the OTT content platform wants to push to the user.

Manifest 800 comprises a footer 850. The footer indicates the end of the manifest 800 and often comprises contextual information such as file extension suffixes (e.g., ".xml," ".m3u8," ".txt," or the like). Further information may also be included in the manifest 800 files such as initialization sources, subtitles, and fallback sources (e.g., failover URLs).

Lines 4, 12, and 15 of manifest 800 also comprise real-time bid tag information. The real-time bid tag further comprises an indication of the priority of that section of manifest 800. In some examples, the priority or a user profile of the user configures the priority. For example, a user profile linked to the user device may configure the context tag to always select the highest priority recommendation data or video content items in the lowest resolution available based on the available bandwidth, but always ensure that video is selected and not audio only (as shown by low priority tag on line). Accordingly, manifest 800 shows that the bid tag information on lines 4, 12, and 15 further includes an indication of priority based on the user's preferences.

The real-time bid information in manifest 800 is shown as a real-time bid tag, shown as BIDTAG="X"="Y", where X is a numerical value and Y is high, medium, or low. It should be understood that this example is intended to be non-limiting and numerous other examples of indicating the tag are possible. In some examples, the user device will search through the manifest 800 to find parts of the manifest 800 of interest indicated by the presence of contextual tags, real-time bid information, real-time bid tags, and/or contextual information 810.

FIG. 9 shows part of a manifest 900 comprising a first segment list 910 and a second segment list 920. The first and second segment lists 910 and 920 of manifest 900 are different examples of the first and second segment lists 820 and 840 of manifest 800, as described with reference to FIG. 8 above. In particular, FIG. 9 illustrates a different way of implementing the real-time bid tag in manifest 900 compared to FIG. 8. For example, and as will be discussed in more detail below, FIG. 9 illustrates tagging each segment URL within the manifest 900 with an indication of bid tag priority such that an automatic real-time bid for an advertisement slot can be made.

In FIG. 9, the indication of bid tag priority is shown for each segment within the first and second segment lists 910 and 920. For example, BIDTAG="L" is shown on line 3, to indicate that the segment contained within the associated segment URL has a bid level (i.e., value) that is low relative to the other segments in the segment list 910. Accordingly, this segment may be displayed last. Each of the segment URLs on lines 3 to 5 and 10 to 12 is shown with an indication of bid tag priority with a relative value of L, M, or H. In this way, the user device has an indication of bid priority (and therefore advertisement priority) for each media content item (i.e., segment) of a plurality of media content items and allows greater granularity when determining a subset of the URLs to retrieve to display on a user device during a loading event, based on recommendation data, the priority of a service to advertise content and, in some examples, the available bandwidth of the user device. Another OTT service may, in real-time during a loading event, push to the user device to upgrade their BIDTAG to a higher priority and have their content consumed sooner, or not at all.

Figure 10:
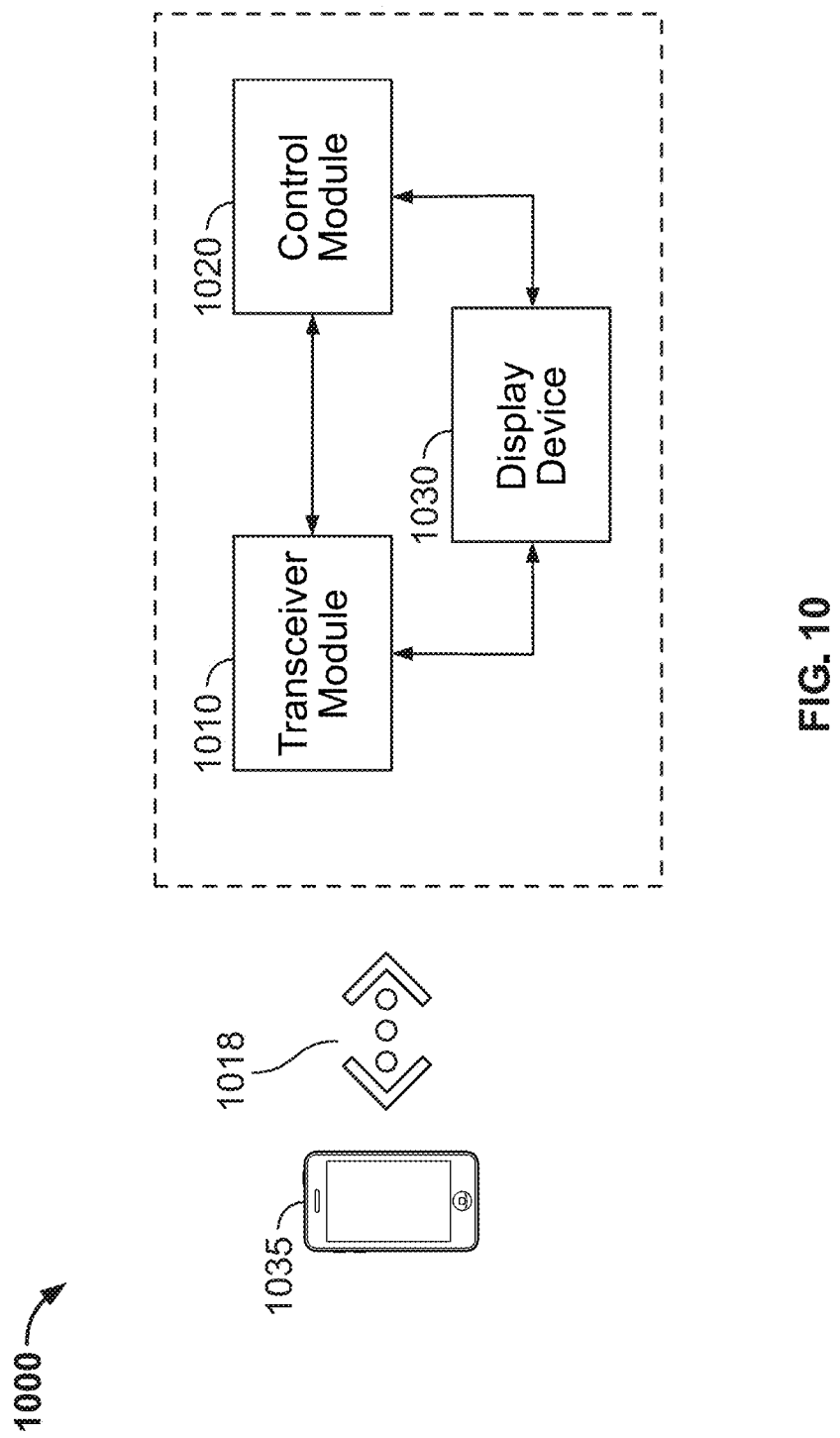
FIG. 10 illustrates an exemplary media transmission device, in accordance with some embodiments of the disclosure.

FIG. 10 illustrates an exemplary media transmission device, in accordance with some embodiments of the disclosure. The media transmission system 1000 comprises a transceiver module 1010, a control module 1020, and a display device 1030. The media transmission system may communicate with an additional user device 1035, such as a home game way, smartphone, or other smart devices. The transceiver module 1010 is configured to receive recommendation data from a recommendation engine and download first media content item based on the recommendation data.

In some examples, the transceiver module communicates with a second user device 1035 via communication link 1018. The communication link 1018 between the transceiver module 1010 and the second user device 1035 may comprise a physical connection, facilitated by an input port such as a 3.5 mm jack, RCA jack, USB port, ethernet port, or any other suitable connection for communicating over a wired connection or may comprise a wireless connection via BLUETOOTH, Wi-Fi, WiMAX, Zigbee, GSM, UTMS, CDMA, TDMA, 3G, 4G, 4G LTE, 5G or other wireless transmissions as described by the relevant 802.11 wireless communication protocols.

In some examples, the display device 1030 is coupled to the transceiver module and control module. The display device 1030 is configured to display the first media content item.

In some examples, the control module 1020 is coupled to the transceiver module 1010 and the display device 1030. The control module 1020 is adapted to detect a loading event; and in response to the loading event, cause the display device to display the first media content item.

In some examples, the communication link 1018 is between the media transmission device 1000 and a home gateway device (such as a user device), which is in turn in communication with the second user device 1035. These examples are considered to be non-limiting and other combinations of the features herein being spread over two or more devices are considered within the scope of this invention. For example, each of the transceiver modules, the display device, and the control module may be separate internet of things (IoT) or edge (i.e., smartphones and tablets) devices.

Figure 11:
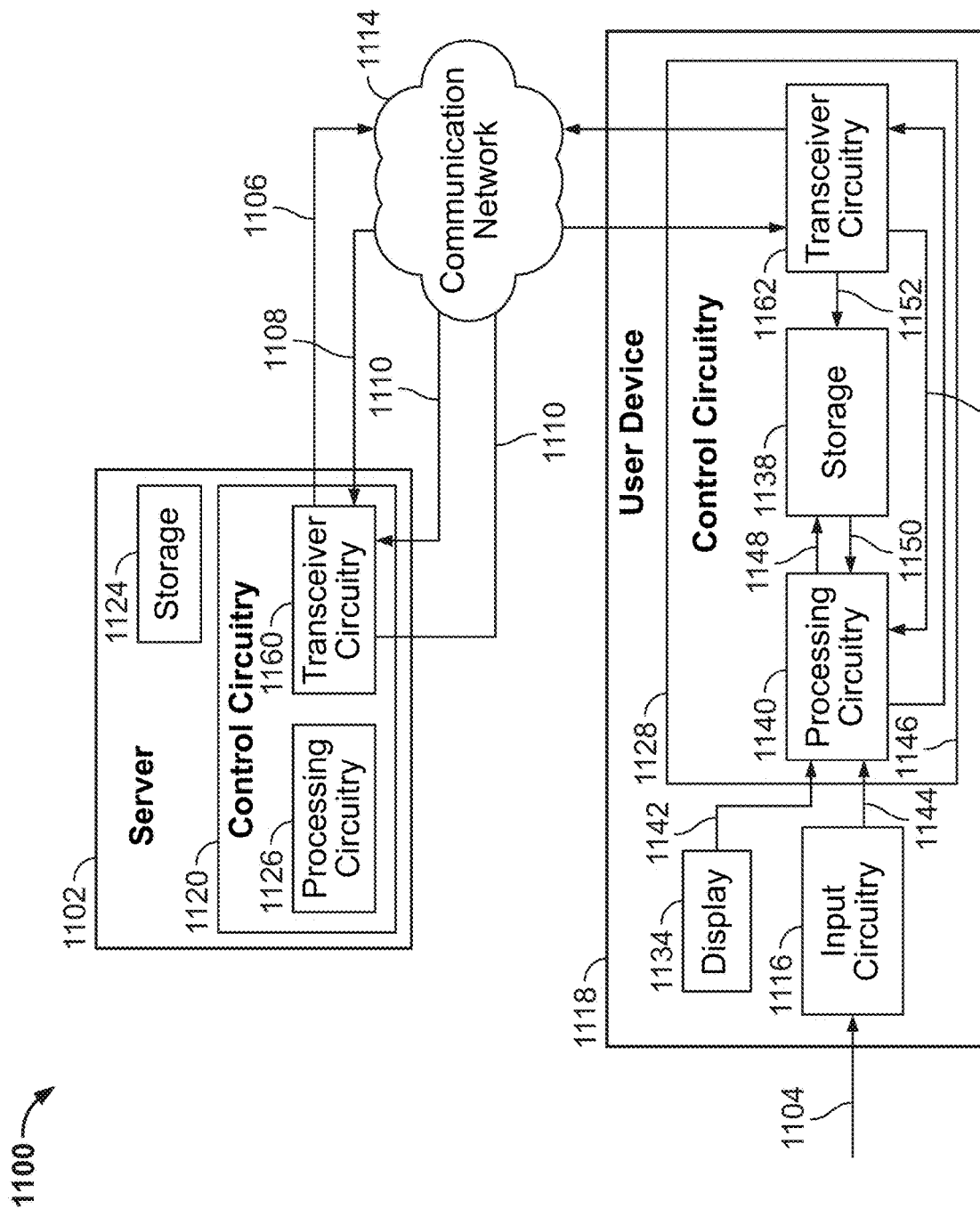
FIG. 11 is a block diagram representing devices, components of each device, and data flow therebetween for an adaptive video streaming system, in accordance with some embodiments of the disclosure.

FIG. 11 is a block diagram representing devices, components of each device, and data flow therebetween for an adaptive video streaming system, in accordance with some embodiments of the disclosure. System 1100 is shown to include a client device 1118, a server 1102, and a communication network 1114. It is understood that while a single instance of a component may be shown and described relative to FIG. 11, additional instances of the component may be employed. For example, server 1102 may include or may be incorporated in, more than one server. Similarly, communication network 1114 may include or may be incorporated in, more than one communication network. Server 1102 is shown communicatively coupled to client device 1118 through communication network 1114. While not shown in FIG. 11, server 1102 may be directly communicatively coupled to client device 1118, for example, in a system absent or bypassing communication network 1114.

In some examples, the media content items are retrieved as an adaptive bitrate stream compatible with the MPEG-DASH standard, or other implementations such as Apple HLS. In some embodiments, the downloading of media content items are encoded at a first maximum bitrate and/or the first resolution. For example, the request may be a request for the next segment of an adaptive bitrate stream, and therefore the first media content item may be requested at a first maximum bitrate (or resolution) based on the first network bandwidth at the time of the request. In some examples, the second media content item content is encoded at a second maximum bitrate and/or a second resolution, such that content is always available, and content at a variety of resolutions and bitrate are requested from a serve 1102. The second media content item may be a higher bitrate version of the first content item, or vice versa, such as an interactive poster or a short video clip. In some examples, the media content is encoded using an adaptive bitrate streaming compatible codec. There are numerous examples of video codecs that are adaptive bitrate streaming compatible (e.g., x264, OpenH264, H.264/MPEG-4 AVC, which are all codecs compatible with the video format H.264). Moreover, there are numerous examples of video formats (e.g., H.264, H.265, VP9, AV1), each of which has numerous examples of video codecs.

Communication network 1114 may comprise one or more network systems, such as, without limitation, an internet, LAN, WIFI, or other network systems suitable for audio processing applications. In some embodiments, system 1100 excludes server 1102, and functionality that would otherwise be implemented by server 1102 is instead implemented by other components of system 1100, such as one or more components of communication network 1114. In still other embodiments, server 1102 works in conjunction with one or more components of communication network 1114 to implement certain functionality described herein in a distributed or cooperative manner. Similarly, in some embodiments, system 1100 excludes client device 1118, and functionality that would otherwise be implemented by the client device 1118 is instead implemented by other components of system 1100, such as one or more components of communication network 1114 or server 1102 or a combination. In still other embodiments, the client device 1118 works in conjunction with one or more components of communication network 1114 or server 1102 to implement certain functionality described herein in a distributed or cooperative manner.

The client device 1118 includes control circuitry 1128, display 1134, and input-output circuitry 1116. Control circuitry 1128 in turn includes transceiver circuitry 1162, storage 1138, and processing circuitry 1140. In some embodiments, client device 1118 or control circuitry 1128 may be configured as client device 1035 of FIG. 10.

Server 1102 includes control circuitry 1120 and storage 1124. Each of the storages 1124 and 1138 may be an electronic storage device. As referred to herein, the phrase "electronic storage device" or "storage device" should be understood to mean any device for storing electronic data, computer software, or firmware, such as random-access memory, read-only memory, hard drives, optical drives, digital video disc (DVD) recorders, compact disc (CD) recorders, BLU-RAY disc (BD) recorders, BLU-RAY 3D disc recorders, digital video recorders (DVRs, sometimes called personal video recorders, or PVRs), solid-state devices, quantum storage devices, gaming consoles, gaming media, or any other suitable fixed or removable storage devices, and/or any combination of the same. Each storage 1124, 1138 may be used to store various types of content, media data, and or other types of data (e.g., they can be used to store multimedia content such as audio, video, and advertisement data). The non-volatile memory may also be used (e.g., to launch a boot-up routine and other instructions). Cloud-based storage may be used to supplement storages 1124, 1138 or instead of storages 1124, 1138. In some embodiments, the media content items, in accordance with the present disclosure, may be stored on one or more of storages 1124, 1138.

In some embodiments, control circuitry 1120 and/or 1128 executes instructions for an application stored on the memory (e.g., storage 1124 and/or storage 1138). Specifically, control circuitry 1120 and/or 1128 may be instructed by the application to perform the functions discussed herein. In some implementations, any action performed by control circuitry 1120 and/or 1128 may be based on instructions received from the application. For example, the application may be implemented as software or a set of executable instructions that may be stored on storage 1124 and/or 1138 and executed by control circuitry 1120 and/or 1128. In some embodiments, the application may be a client/server application where only a client application resides on client device 1118, and a server application resides on server 1102.

The application may be implemented using any suitable architecture. For example, it may be a stand-alone application wholly implemented on client device 1118. In such an approach, instructions for the application are stored locally (e.g., in storage 1138), and data for use by the application is downloaded periodically (e.g., from an out-of-band feed, from an internet resource, or using another suitable approach). Control circuitry 1128 may retrieve instructions for the application from storage 1138 and process the instructions to perform the functionality described herein. Based on the processed instructions, control circuitry 1128 may determine a type of action to perform in response to input received from the input/output path (or input-output circuitry) 1116 or the communication network 1114. For example, in response to a network bandwidth maximum, control circuitry 1128 may perform the steps of processes relative to various embodiments discussed herein.

In client/server-based embodiments, control circuitry 1128 may include communication circuitry suitable for communicating with an application server (e.g., server 1102) or other networks or servers. The instructions for carrying out the functionality described herein may be stored on the application server. Communication circuitry may include a cable modem, an Ethernet card, a wireless modem for communication with other equipment, or any other suitable communication circuitry. Such communication may involve the internet or any other suitable communication networks or paths (e.g., communication network 1114). In another example of a client/server-based application, control circuitry 1128 runs a web browser that interprets web pages provided by a remote server (e.g., server 1102). For example, the remote server may store the instructions for the application in a storage device. The remote server may process the stored instructions using circuitry (e.g., control circuitry 1128) and/or generate displays. Client device 1118 may receive the displays generated by the remote server and may display the content of the displays locally via display 1134. This way, the processing of the instructions is performed remotely (e.g., by server 1102) while the resulting displays, such as the display windows described elsewhere herein, are provided locally on the client device 1118. Client device 1118 may receive inputs from the user via input circuitry 1116 and transmit those inputs to the remote server for processing and generating the corresponding displays. Alternatively, client device 1118 may receive inputs from the user via input circuitry 1116 and process and display the received inputs locally, by control circuitry 1128 and display 1134, respectively.

Server 1102 and client device 1118 may transmit and receive content and data such as media content via communication network 1114. For example, server 1102 may be a media content provider, and client device 1118 may be a smart television configured to download or stream media content, such as a YouTube video, from server 1102. Control circuitry 1120, 1128 may send and receive commands, requests, and other suitable data through communication network 1114 using transceiver circuitry 1160, 1162, respectively. Control circuitry 1120, 1128 may communicate directly with each other using transceiver circuitry 1160, 1162, respectively, avoiding communication network 1114.

It is understood that client device 1118 is not limited to the embodiments and methods shown and described herein. In non-limiting examples, the client device 1118 may be a television, a Smart TV, a set-top box, an integrated receiver decoder (IRD) for handling satellite television, a digital storage device, a digital media receiver (DMR), a digital media adapter (DMA), a streaming media device, a DVD player, a DVD recorder, a connected DVD, a local media server, a BLU-RAY player, a BLU-RAY recorder, a personal computer (PC), a laptop computer, a tablet computer, a WebTV box, a personal computer television (PC/TV), a PC media server, a PC media center, a handheld computer, a stationary telephone, a personal digital assistant (PDA), a mobile telephone, a portable video player, a portable music player, a portable gaming machine, a smartphone, or any other device, client equipment, or wireless device, and/or combination of the same capable of suitably displaying and manipulating media content.

Control circuitry 1120 and/or 1118 may be based on any suitable processing circuitry such as processing circuitry 1126 and/or 1140, respectively. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores). In some embodiments, processing circuitry may be distributed across multiple separate processors, for example, multiple of the same type of processors (e.g., two Intel Core i9 processors) or multiple different processors (e.g., an Intel Core i7 processor and an Intel Core i9 processor).

Client device 1118 receives a user input 1104 at input circuitry 1116. For example, client device 1118 may receive a user input like a user swipe or user touch, as previously discussed. In some embodiments, client device 1118 is a media device (or player), with the capability to access media content. It is understood that client device 1118 is not limited to the embodiments and methods shown and described herein. In non-limiting examples, the client device 1118 may be a television, a Smart TV, a set-top box, an integrated receiver decoder (IRD) for handling satellite television, a digital storage device, a digital media receiver (DMR), a digital media adapter (DMA), a streaming media device, a DVD player, a DVD recorder, a connected DVD, a local media server, a BLU-RAY player, a BLU-RAY recorder, a personal computer (PC), a laptop computer, a tablet computer, a WebTV box, a personal computer television (PC/TV), a PC media server, a PC media center, a handheld computer, a stationary telephone, a personal digital assistant (PDA), a mobile telephone, a portable video player, a portable music player, a portable gaming machine, a smartphone, or any other television equipment, computing equipment, or wireless device, and/or combination of the same.

User input 1104 may be received from a user selection-capturing interface that is separate from device 1118, such as a remote-control device, trackpad, or any other suitable user movement sensitive or capture devices, or as part of device 1118, such as a touchscreen of display 1134. Transmission of user input 1104 to client device 1118 may be accomplished using a wired connection, such as an audio cable, USB cable, ethernet cable, or the like attached to a corresponding input port at a local device, or may be accomplished using a wireless connection, such as BLUETOOTH, Wi-Fi, WiMAX, ZIGBEE, GSM, UTMS, CDMA, TDMA, 3G, 4G, 4G LTE, or any other suitable wireless transmission protocol. Input circuitry 1116 may comprise a physical input port such as a 3.5 mm audio jack, RCA audio jack, USB port, ethernet port, or any other suitable connection for receiving audio over a wired connection, or may comprise a wireless receiver configured to receive data via BLUETOOTH, Wi-Fi, WiMAX, ZIGBEE, GSM, UTMS, CDMA, TDMA, 3G, 4G, 4G LTE, or other wireless transmission protocols.

Processing circuitry 1140 may receive input 1104 from input circuit 1116. Processing circuitry 1140 may convert or translate the received user input 1104 that may be in the form of gestures or movement to digital signals. In some embodiments, input circuit 1116 performs the translation to digital signals. In some embodiments, processing circuitry 1140 (or processing circuitry 1126, as the case may be) carries out disclosed processes and methods.

The systems and processes discussed above are intended to be illustrative and not limiting. One skilled in the art would appreciate that the actions of the processes discussed herein may be omitted, modified, combined, and/or rearranged, and any additional actions may be performed without departing from the scope of the invention. More generally, the above disclosure is meant to be exemplary and not limiting. Only the claims that follow are meant to set bounds as to what the present disclosure includes. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real-time. It should also be noted that the systems and/or methods described above may be applied to, or used in accordance with, other systems and/or methods. In this specification, the following terms may be understood given the below explanations:

All of the features disclosed in this specification (including any accompanying claims, abstract, and drawings), and/or all of the steps of any method or process so disclosed, may be combined in any combination, except combinations where at least some of such features and/or steps are mutually exclusive.

Each feature disclosed in this specification (including any accompanying claims, abstract, and drawings), may be replaced by alternative features serving the same, equivalent or similar purpose unless expressly stated otherwise. Thus, unless expressly stated otherwise, each feature disclosed is one example only of a generic series of equivalent or similar features.

The invention is not restricted to the details of any foregoing embodiments. The invention extends to any novel one, or any novel combination, of the features disclosed in this specification (including any accompanying claims, abstract, and drawings), or to any novel one, or any novel combination, of the steps of any method or process so disclosed. The claims should not be construed to cover merely the foregoing embodiments, but also any embodiments which fall within the scope of the claims.

Throughout the description and claims of this specification, the words "comprise" and "contain" and variations of them mean "including but not limited to", and they are not intended to (and do not) exclude other moieties, additives, components, integers or steps. Throughout the description and claims of this specification, the singular encompasses the plural unless the context otherwise requires it. In particular, where the indefinite article is used, the specification is to be understood as contemplating plurality as well as singularity, unless the context requires otherwise.

All of the features disclosed in this specification (including any accompanying claims, abstract, and drawings), and/or all of the steps of any method or process so disclosed, may be combined in any combination, except combinations where at least some of such features and/or steps are mutually exclusive. The invention is not restricted to the details of any foregoing embodiments. The invention extends to any novel one, or any novel combination, of the features disclosed in this specification (including any accompanying claims, abstract, and drawings), or to any novel one, or any novel combination, of the steps of any method or process so disclosed.

The reader's attention is directed to all papers and documents which are filed concurrently with or previous to this specification in connection with this application and which are open to public inspection with this specification, and the contents of all such papers and documents are incorporated herein by reference.

The invention claimed is:

1. A method of displaying content to a user during a loading event, the method comprising:
   receiving recommendation data from a recommendation engine of a first over-the-top (OTT) service while the user consumes media content on a second OTT service, wherein the recommendation data is generated based on a user consumption history of media content on the first OTT service;
   downloading a first media content item from the first OTT based on the recommendation data;
   detecting a loading event on the second OTT service, wherein the second OTT service is not the first OTT service; and
   in response to the loading event, displaying the first media content item on the second OTT service, wherein the first media content item is displayed as an overlay on a user interface, further comprising:
      reducing a size of the first media content item as a function of completion of the loading event, such that the user interface becomes more visible the more completed the loading event is.

2. The method of claim 1, wherein the downloading of the first media content item is during a first viewing session, and the detection of the loading event is during a second viewing session.

3. The method of claim 2, wherein the recommendation data comprises a list of media content items and an indication of priority of the media content items to be recommended to the user, and the first media content item is the highest priority media content to be recommended to the user.

4. The method of claim 3, further comprising:
downloading a second media content item during the first viewing session; and
wherein the second media content item is the second highest priority media content to be recommended to the user.

5. The method of claim 4, further comprising:
determining that the first media content item has finished being displayed during the loading event; and
displaying the second media content item after the first media content item.

6. The method of claim 3, wherein the list of media content items comprises media content that is not available for viewing at the first viewing sessions and further comprises downloading a third media content item, that is not available for viewing at the first viewing session.

7. The method of claim 6, further comprising:
determining that the third media content item is available for viewing during the second viewing session;
determining that the third media content item has the highest priority out of the downloaded media content items; and
displaying the third media content item during the second viewing session.

8. The method of claim 2, further comprising:
determining the user is about to finish the first viewing session;
in response to determining the user is about to finish the first viewing session:
updating the recommendation data; and
downloading media content items based on the updated recommendation data to be displayed at the second viewing session.

9. The method of claim 8, wherein determining the user is about to finish the first viewing session is based on at least one of:
detecting a media content item is about to finish;
user watching pattern;
user watch history; and
determining a current time is near the user's bedtime.

10. The method of claim 1, wherein the recommendation data comprises at least one of sequel, subsequent episode, and spin-off series.

11. The method of claim 1, further comprising:
storing the recommendation data in local storage; and
in response to detecting the loading event, retrieving the first media content from local storage.

12. The method of claim 11, wherein the local storage is a cache storage.

13. The method of claim 1, wherein the first media content item is at least one of:
a plurality of frames;
a sound clip;
an interactive poster;
artwork;
personalized artwork; or
a combination thereof.

14. The method of claim 1, wherein the first media content item has a minimum size, further comprising:
detecting that the loading event has finished; and
setting the size of the first media content item to the minimum size.

15. An apparatus for displaying content to a user during a loading event, the apparatus comprising a transceiver module, control module and a display device, the control module configured to:
receive recommendation data from a recommendation engine of a first over-the-top (OTT) service while the user consumes media content on a second OTT service, wherein the recommendation data is generated based on a user consumption history of media content on the first OTT service;
download, via the transceiver module, a first media content item from the first OTT based on the recommendation data;
detect a loading event on the second OTT service, wherein the second OTT service is not the first OTT service; and
in response to the loading event, display, on the display device, the first media content item on the second OTT service, wherein the first media content item is displayed as an overlay on a user interface, further comprising:
reducing a size of the first media content item as a function of completion of the loading event, such that the user interface becomes more visible the more completed the loading event is.

16. A non-transitory computer-readable medium having instructions encoded thereon for carrying out a method, the method comprising:
receiving recommendation data from a recommendation engine of a first over-the-top (OTT) service while the user consumes media content on a second OTT service, wherein the recommendation data is generated based on a user consumption history of media content on the first OTT service;
downloading a first media content item from the first OTT based on the recommendation data;
detecting a loading event on the second OTT service, wherein the second OTT service is not the first OTT service; and
in response to the loading event, displaying the first media content item on the second OTT service, wherein the first media content item is displayed as an overlay on a user interface, further comprising:
reducing a size of the first media content item as a function of completion of the loading event, such that the user interface becomes more visible the more completed the loading event is.

* * * * *